(12) United States Patent
Ranzinger (10) Patent No.: US 11,468,051 B1
(45) Date of Patent: Oct. 11, 2022

(54) COMPOSITION AWARE IMAGE SEARCH REFINEMENT USING RELEVANCE FEEDBACK

(71) Applicant: Shutterstock, Inc., New York, NY (US)

(72) Inventor: Michael Ranzinger, Boulder, CO (US)

(73) Assignee: Shutterstock, Inc., New York, NY (US)

( * ) Notice: Subject to any disclaimer, the term of this patent is extended or adjusted under 35 U.S.C. 154(b) by 380 days.

(21) Appl. No.: 15/898,161

(22) Filed: Feb. 15, 2018

(51) Int. Cl.
*G06F 16/242* (2019.01)
*G06F 16/51* (2019.01)

(52) U.S. Cl.
CPC .......... *G06F 16/2425* (2019.01); *G06F 16/51* (2019.01)

(58) Field of Classification Search
CPC ...... G06F 16/71; G06F 16/51; G06F 16/7844; G06F 16/2425; G06F 16/7847; G06F 16/7867; G06F 16/29; G06F 16/5854; H04N 5/2256; H04N 5/2252; H04N 5/2253; H04N 2/2258; H04N 5/2354; H04N 5/247; H04N 7/18; H04N 7/183
See application file for complete search history.

(56) References Cited

U.S. PATENT DOCUMENTS

| | | | | |
|---|---|---|---|---|
| 5,802,361 A * | 9/1998 | Wang | ................ | G06F 16/7335 |
| | | | | 382/217 |
| 7,099,860 B1 * | 8/2006 | Liu | ................ | G06F 16/58 |
| 7,421,125 B1 * | 9/2008 | Rees | ................ | G06K 9/34 |
| | | | | 382/181 |
| 7,657,100 B2 * | 2/2010 | Gokturk | ................ | G06K 9/46 |
| | | | | 382/209 |
| 8,156,136 B2 * | 4/2012 | Davis | ................ | G06K 9/0063 |
| | | | | 707/766 |
| 8,732,025 B2 * | 5/2014 | Gokturk | ................ | G06Q 30/0625 |
| | | | | 705/26.1 |
| 10,062,173 B1 * | 8/2018 | Padfield | ................ | G06K 9/6255 |
| (Continued) | | | | |

OTHER PUBLICATIONS

Zhang et al., "Relevance Feedback and Learning in Content-Based Image Search," World Wide Web: Internet and Web Information Systems, 6, 131-155 (Year: 2003).*

(Continued)

*Primary Examiner* — Ashish Thomas
*Assistant Examiner* — Mellissa M. Ohba
(74) *Attorney, Agent, or Firm* — McDermott Will & Emery LLP (57) ABSTRACT

Methods for composition aware image search refinement using relevance feedback. A method includes receiving, in response to user input, a relevance area within a plurality of image results, wherein the plurality of image results are provided for display on a user interface in response to a first search query using a plurality of spatial anchors in association with respective semantic datasets, and wherein the relevance area is associated with a target semantic dataset. The method also includes determining a mapping from the target semantic dataset to the plurality of spatial anchors, adjusting, based on the mapping, the semantic datasets associated with the plurality of spatial anchors, and providing for display, in the user interface, a plurality of refined image results in response to a second search query using the plurality of spatial anchors in association with the adjusted semantic datasets.

20 Claims, 7 Drawing Sheets

(56) References Cited

U.S. PATENT DOCUMENTS

| | | | |
|---|---|---|---|
| 10,163,227 B1* | 12/2018 | Lester | G06T 9/002 |
| 10,437,878 B2* | 10/2019 | Ranzinger | G06K 9/4604 |
| 10,503,775 B1* | 12/2019 | Ranzinger | G06K 9/6202 |
| 10,584,940 B2* | 3/2020 | Northrup | F41G 3/2633 |
| 10,964,078 B2* | 3/2021 | Wiesel | G06V 10/255 |
| 2007/0217676 A1* | 9/2007 | Grauman | G06K 9/6212 |
| | | | 382/170 |
| 2008/0177640 A1* | 7/2008 | Gokturk | G06Q 30/02 |
| | | | 705/26.62 |
| 2009/0313239 A1* | 12/2009 | Wen | G06K 9/00664 |
| 2015/0116350 A1* | 4/2015 | Lin | G06N 7/005 |
| | | | 345/620 |
| 2018/0121768 A1* | 5/2018 | Lin | G06N 3/08 |
| 2018/0232451 A1* | 8/2018 | Lev-Tov | G06F 16/248 |
| 2019/0050427 A1* | 2/2019 | Wiesel | G06T 7/11 |

OTHER PUBLICATIONS

Su et al., "Efficient relevance feedback for content-based image retrieval by mining user navigation patterns," IEEE Transactions on Knowledge and Data Engineering, vol. 23, No. 3, Mar. 2011 (Year: 2011).*

Uluwitige et al., "Content-Based Image Retrieval with Image Signatures," Queensland University of Technology School of Electrical Engineering and Computer Science Faculty of Science and Engineering (Year: 2017).*

Carson et al.; "Region-Based Image Querying;" 1997, Computer Science Division University of California at Berkeley (Year: 1997).*

Razinger et al., "Composition Aware Search," Whitepaper downloaded Nov. 2017 from https://www.shutterstock.com/labs/compositionsearch/whitepaper, 9 pages.

Mai et al., "Spatial-Semantic Image Search by Visual Feature Synthesis," downloaded Nov. 2017 from http://openaccess.thecvf.com/content_cvpr_2017/papers/Mai_Spatial-Semantic_Image_Search_CVPR_2017_paper.pdf, pp. 4718-4727.

Babenko, A., et al. "The Inverted Multi-index." In Computer Vision and Pattern Recognition (CVPR), 2012 IEEE Conference on, pp. 3069-3076. IEEE, 2012.

Bingham, E. et al. al., "Random Projection in Dimensionality Reduction: Applications to Image and Text Data." In Proceedings of the seventh ACM SIGKDD international conference on Knowledge discovery and data mining, 2001, pp. 245-250. ACM.

Clevert, D-A., et al. "Fast and Accurate Deep Network Learning by Exponential Linear Units (ELUs)." arXiv preprint arXiv: 1511.07289, 2015.

Douze, M., et al., "Polysemous Codes." In European Conference on Computer Vision, pp. 785-801. Springer, 2016.

Girshick, R., "Fast R-CNN." In Proceedings of the IEEE International Conference on Computer Vision, pp. 1440-1448, 2015.

Glorot, X., et al., "Deep Sparse Rectifier Neural Networks." Proceedings of the 14th International Conference on Artificial Intelligence and Statistics (AISTATS) 2011, Fort Lauderdale, FL, USA. vol. 15; pp. 315-323, 2011.

Gray, R., "Vector Quantization." IEEE ASSP Magazine, Apr. 1984, 1(2); pp. 4-29.

Ioffe, S., et al., "Batch Normalization: Accelerating Deep Network Training by Reducing Internal Covariate Shift." Proceedings of the 32nd International Conference on Machine Learning, 2015, vol. 37, pp. 1-9, Lille, FR.

Jegou, H. et al., "Product Quantization for Nearest Neighbor Search." IEEE Transactions on Pattern Analysis and Machine Intelligence, Institute of Electrical and Electronics Engineers, 2011, 33(1), pp. 117-128.

Johnson, J., et al., DenseCap: Fully Convolutional Localization Networks for Dense Captioning. In Proceedings of the IEEE Conference on Computer Vision and Pattern Recognition, 2016, pp. 4565-4574.

Kiros, R., et al., Unifying Visual-Semantic Embeddings with Multimodal Neural Language Models. arXiv preprint arXiv:1411.2539v1, 2014, pp. 1-13.

Mao, J. et al., "Training and Evaluating Multimodal Word Embeddings with Large-scale Web Annotated Images." 30th Conference on Neural Information Processing Systems (NIPS 2016), Barcelona, Spain; 1611.08321, 2016; pp. 1-9.

Ren, S. et al., Faster R-CNN: Towards Real-time Object Detection with Region Proposal Networks. In Advances in neural information processing systems, Jun. 4, 2015, Microsoft Research, pp. 91-99.

Russakovsky, O., et al., "ImageNet Large Scale Visual Recognition Challenge." International Journal of Computer Vision (IJCV), 2015, 115(3):211-252.

Razavian, A.S., et al., CNN Features off-the-shelf: an Astounding Baseline for Recognition. In Proceedings of the IEEE Conference on Computer Vision and Pattern Recognition Workshops, 2014, pp. 806-813.

Sivic, J. et al., Video google: A text retrieval approach to object matching in videos. In IEEE International Conference on Computer Vision (ICCV2003), vol. 2, pp. 1470-1477.

Szegedy, C. et al., "Rethinking the inception architecture for computer vision." In Proceedings of the IEEE Conference on Computer Vision and Pattern Recognition, 2006, pp. 2818-2826.

Terasawa, K., et al., "Spherical Ish for Approximate Nearest Neighbor Search on Unit Hypersphere." In Workshop on Algorithms and Data Structures, 2007, pp. 27-38. Springer.

Vinyals, O. et al., "Show and tell: Lessons Learned from the 2015 MSCOCO Image Captioning Challenge." IEEE Transactions on Pattern Analysis and Machine Intelligence, 2017, 39(4):652-663.

Zhou, B., et al., "Learning Deep Features for Discriminative Localization." In Proceedings of the IEEE Conference on Computer Vision and Pattern Recognition, 2016, pp. 2921-2929.

* cited by examiner

COMPOSITION AWARE IMAGE SEARCH REFINEMENT USING RELEVANCE FEEDBACK

TECHNICAL FIELD

The present disclosure generally relates to image search, and more specifically relates to composition aware image search using relevance feedback.

BACKGROUND

Interfaces with appropriate data algorithms to search an image corpus for results that optimally match a searcher's search constraints while maintaining specified object placement are commonly not available over existing networks. For example, commonly available keyword based image searches are often defined at a very high level, which makes it difficult to obtain images having a defined object placement within the image. Even if correct object placement is obtained, refining or drilling down the search in an attempt to obtain more relevant results often instead moves away from a specified object placement.

The description provided in the background section should not be assumed to be prior art merely because it is mentioned in or associated with the background section. The background section may include information that describes one or more aspects of the subject technology.

SUMMARY

The disclosed system provides composition aware image search refinement using relevance feedback. An initial composition aware search may be performed that includes defined positional constraints for search queries. After presenting results of the search for display, feedback may be received that indicates relevance areas within the results. The composition aware search may be modified according to the received relevance areas and executed again, and the resulting refined image results may be output for display to provide highly relevant results while maintaining the positional constraints of the initial search.

According to certain aspects of the present disclosure, a computer-implemented method is provided. The method includes receiving, in response to user input, a relevance area within a plurality of image results, wherein the plurality of image results are provided for display on a user interface in response to a first search query using a plurality of spatial anchors in association with respective semantic datasets, and wherein the relevance area is associated with a target semantic dataset. The method also includes determining a mapping from the target semantic dataset to the plurality of spatial anchors. The method also includes adjusting, based on the mapping, the semantic datasets associated with the plurality of spatial anchors. The method also includes providing for display, in the user interface, a plurality of refined image results in response to a second search query using the plurality of spatial anchors in association with the adjusted semantic datasets.

According to certain aspects of the present disclosure, a system is provided including a memory, and a processor configured to execute instructions. When executed, the instructions cause the processor to receive, in response to user input, a relevance area within a plurality of image results, wherein the plurality of image results are provided for display on a user interface in response to a first search query using a plurality of spatial anchors in association with respective semantic datasets, and wherein the relevance area is associated with a target semantic dataset. The instructions also cause the processor to determine a mapping from the target semantic dataset to the plurality of spatial anchors. The instructions also cause the processor to adjust, based on the mapping, the semantic datasets associated with the plurality of spatial anchors by moving the semantic datasets towards the target semantic dataset. The instructions also cause the processor to provide for display, in the user interface, a plurality of refined image results in response to a second search query using the plurality of spatial anchors in association with the adjusted semantic datasets.

According to certain aspects of the present disclosure, a non-transitory machine-readable storage medium is provided that includes machine-readable instructions for causing a processor to execute a method. The method includes receiving, in response to user input, a relevance area within a plurality of image results, wherein the plurality of image results are provided for display on a user interface in response to a first networked search query using a plurality of spatial anchors in association with respective semantic datasets each comprising vectors of a fixed number of dimensions from a vision model, and wherein the relevance area is associated with a target semantic dataset. The method also includes determining a mapping from the target semantic dataset to the plurality of spatial anchors. The method also includes adjusting, based on the mapping, the semantic datasets associated with the plurality of spatial anchors by moving the semantic datasets towards the target semantic dataset. The method also includes providing for display, in the user interface, a plurality of refined image results in response to a second networked search query using the plurality of spatial anchors in association with the adjusted semantic datasets.

According to certain aspects of the present disclosure, a system is provided. The system includes means for displaying a plurality of image results on a user interface in response to a first search query using a plurality of spatial anchors in association with respective semantic datasets. The system also includes means for receiving, in response to user input, a relevance area within the plurality of image results, wherein the relevance area is associated with a target semantic dataset. The system also includes means for determining a mapping from the target semantic dataset to the plurality of spatial anchors, and for adjusting, based on the mapping, the semantic datasets associated with the plurality of spatial anchors. The means for displaying the plurality of image results also displays, in the user interface, a plurality of refined image results in response to a second search query using the plurality of spatial anchors in association with the adjusted semantic datasets.

According to certain aspects of the present disclosure, a computer-implemented method is provided. The method includes executing a first search query using a plurality of spatial anchors in association with respective semantic datasets. The method also includes providing a plurality of image results for display on a user interface in response to executing the first search query. The method also includes receiving a relevance area within the plurality of image results, wherein the relevance area is associated with a target semantic dataset. The method also includes determining a mapping from the target semantic dataset to the plurality of spatial anchors. The method also includes adjusting, based on the mapping, the semantic datasets associated with the plurality of spatial anchors. The method also includes executing a second search query using the plurality of spatial anchors in association with the adjusted semantic datasets.

The method also includes providing a plurality of refined image results for display on the user interface in response to executing the second search query.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

With the increased availability of cameras, touchscreens, pen tablets, document scanners, and other devices, it is easier than ever to capture or create images for social, creative, and business endeavors. Image search may be conducted over networks such as the Internet to leverage this creative output. However, with an increasingly large corpus of images available to search, it becomes increasingly important for image search algorithms to return relevant image matches that meet user search criteria within a reasonable expenditure of time and effort.

Composition aware search provides methods for users to specify a placement of objects or query terms in an image search. This enables the user to tailor the image search according to more detailed user search criteria compared to keyword or natural language searches. For example, a user can specify that "wine" should appear in the left side of an image, and that "cheese" should appear in the right side of the image. For example, a user interface may be provided that allows the user to add, move, and resize anchor regions that specify placements for the search queries. The anchor regions may include squares, rectangles, circles, ovals, or other shapes. Thus, the user might add a first circular anchor on the left side of an image canvas and type in "wine" as an associated search query, and further add a second circular anchor on the right side of the image canvas and type in "cheese" as an associated search query.

Once a set of image results is provided for composition aware search, refining the results may be limited to changing the content of the query terms (wine and cheese) and/or moving or adjusting the placement of the query terms (left side and right side). In many cases, these refining actions may provide less relevant results for the user.

Alternatively, the user may select an image result and request related images similar to the selected image result. However, since the related image search may not consider the object positioning in the original composition aware search, the retrieved related images may actually be less relevant for the user.

Thus, there is a need for composition aware image search that provides an optimized way to refine for more relevant image matches.

The disclosed system provides composition aware image search refinement using relevance feedback. Initially, a composition aware search interface may be presented which enables the user to define anchors for regions of an image canvas, wherein each anchor is associated with a search query. After executing the search, image results are provided for display. The user can provide relevance feedback by selecting one or more relevance areas within the image results. A mapping is then generated from the relevance feedback to the anchors, and the search queries may be adjusted according to the mapping. Another composition aware search may be performed with the modified search queries, and the resulting refined image results may be output for display.

The disclosed system addresses a technical problem tied to computer technology and arising in the realm of computer networks, namely the technical problem of providing networked image search that can maintain search query positional constraints while providing efficient refinement or narrowing of the search results. Since the refinement continues to use the same positional constraints as the original search, refinement iterations do not move away from the originally defined spatial positioning. Further, since the relevance feedback corresponds to region selections within the image results, a simplified user interface can be provided wherein the user simply selects images or image portions that appear similar to the desired results. As a result, the user can quickly and intuitively iterate towards the most relevant image results. Performance of the computer is improved since less time and computational resources are used to retrieve unrelated or irrelevant images. Additionally, by avoiding the transmission of irrelevant images over the network, network performance is also improved by reducing network bandwidth usage.

Example System Architecture

Figure 1:
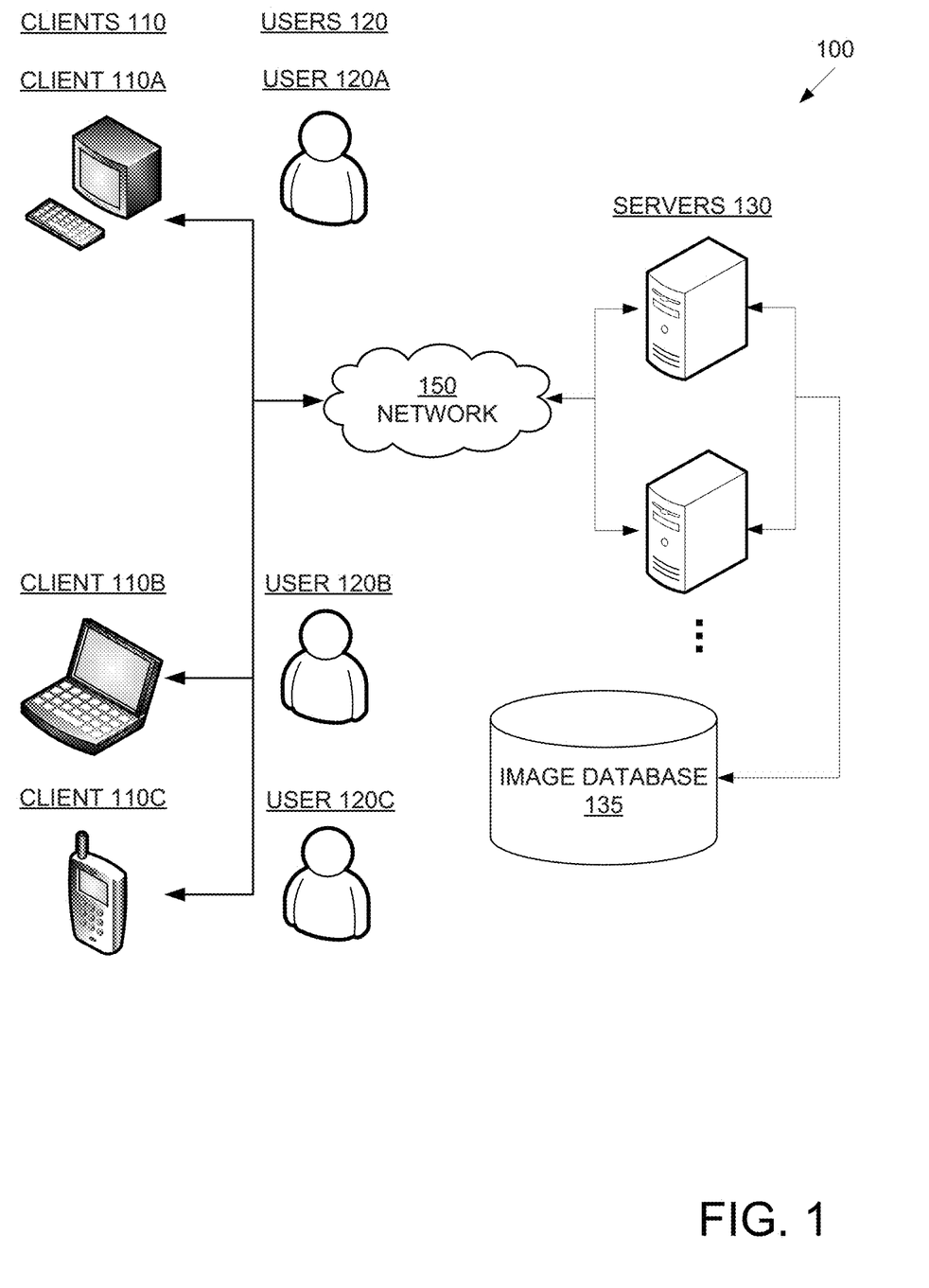
FIG. 1 illustrates an example architecture for composition aware image search refinement using relevance feedback.

FIG. 1 illustrates an example architecture 100 for composition aware image search refinement using relevance feedback. The architecture 100 includes clients 110 and servers 130 connected over a network 150. Servers 130 may connect and communicate with image database 135, for example, over a local intranet. In some aspects of the subject technology, servers 130 may instead connect to image database 135 over network 150. Users 120 may interact with respective clients 110. While user 120A, user 120B, and user 120C are shown to be associated with a respective client 110A, client 110B, and client 110C, each of users 120 may also be associated with multiple devices or clients 110.

Clients 110 may each execute a respective web browser that accesses an in-browser image search that is provided by one of servers 130, which may include web servers. As shown in FIG. 1, a variety of different devices may execute the in-browser image search, including a desktop or client 110A, a laptop or client 110B, and a smartphone or client 110C.

The in-browser image search may provide a variety of searching methods, including composition aware search. As discussed above, composition aware search allows the user to define the desired positioning of objects in the image search. Once a set of image results are provided, the image results can be refined according to relevance feedback received from the user. This refinement process can continue iterating until the user finds a matching image.

The clients 110 can be any device having an appropriate processor, memory, and communications capability for executing the in-browser image editor. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities.

One of the many servers 130 is configured to host a web server. For the purposes of load balancing, multiple servers 130 can host the web servers, which may be configured as a content delivery network (CDN). In certain aspects, one or more of the servers 130 can be a cloud computing server of an infrastructure-as-a-service (IaaS), and be able to support a platform-as-a-service (PaaS) and software-as-a-service (SaaS) services.

The web server may provide web content in response to requests from web browsers. The web content may include the in-browser image search, which may be retrieved from clients 110 and optionally stored locally in a cache. The web server may also provide access to an image corpus or a collection of images stored on image database 135, which may include user generated content provided by users 120, provider generated images such as stock photos, and other images provided by business partners or other entities.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
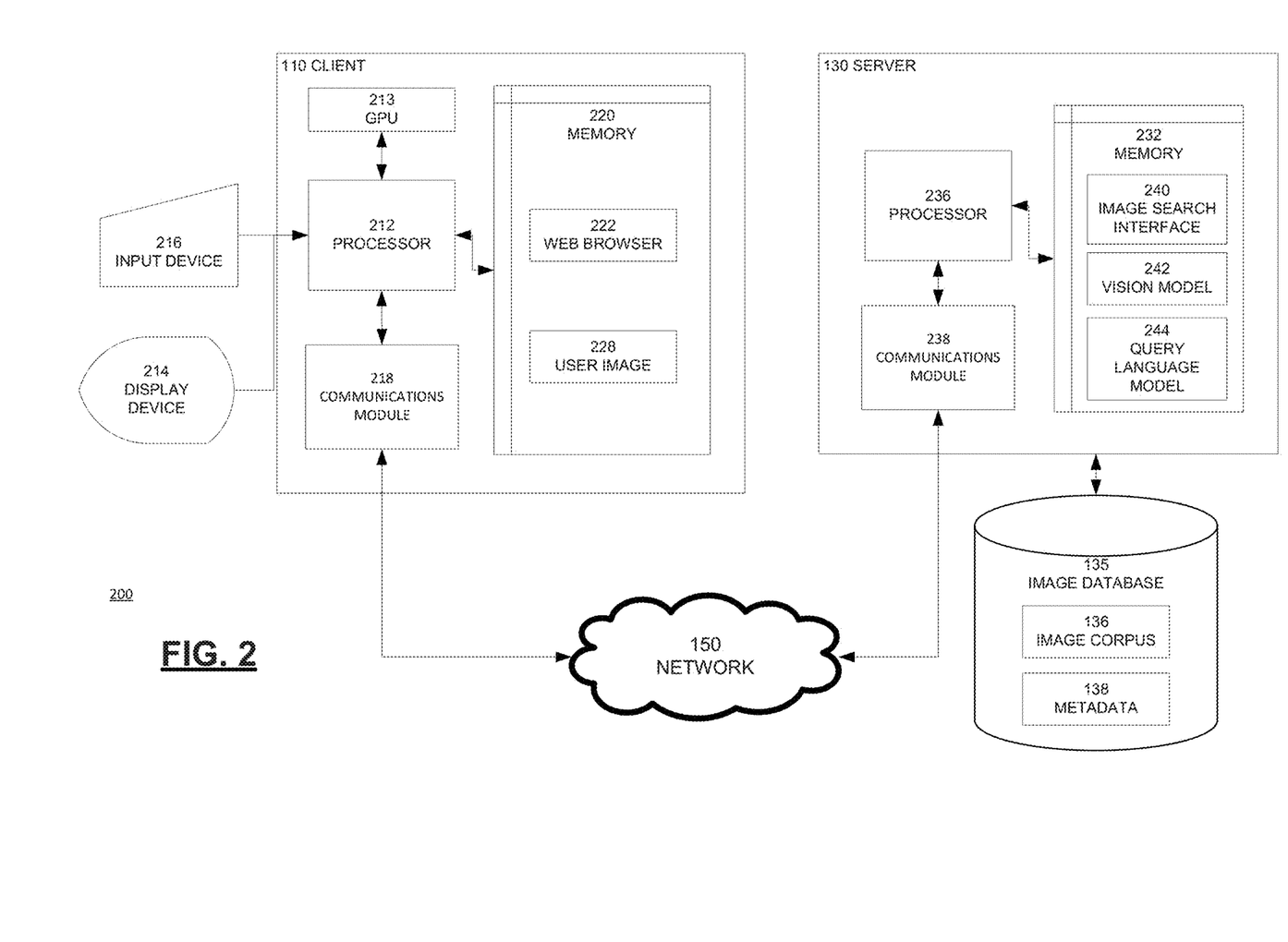
FIG. 2 is a block diagram illustrating an example client and server from the architecture of FIG. 1 according to certain aspects of the disclosure.

Example System for Providing Composition Aware Image Search Refinement Using Relevance Feedback FIG. 2 is a block diagram 200 illustrating an example server 130, client 110, and image database 135 from the architecture of FIG. 1 according to certain aspects of the disclosure. The client 110 and server 130 are connected over the network 150 via respective communications modules 218 and 238. The communications modules 218 and 238 are configured to interface with the network 150 and to receive information, such as data, requests, responses, and commands to other devices on the network. The communications modules 218 and 238 can be, for example, modems or Ethernet cards. Server 130 may also communicate with image database 135 using communications module 238, for example, to issue database queries and add database records.

Client 110 includes processor 212, GPU 213, communications module 218, and memory 220. The client 110 also includes an input device 216, such as a keyboard, mouse, touchscreen, or pen digitizer, and a display device 214. The processor 212 of the client 110 is configured to execute instructions, such as instructions physically coded into the processor 212, instructions received from software in memory 220, or a combination of both.

For example, the processor 212 of client 110 may execute web browser 222, and a user may direct web browser 222 to access a uniform resource locator (URL) pointing to server 130 to access image search interface 240. Client 110 may download and store image search interface 240 into memory 220, which may include a non-volatile browser cache. Image search interface 240 may be rendered in a browser window or in full screen mode on display device 214, and the user may use input device 216 to interact with image search interface 240. Memory 220 may also include a user image 228, which may be uploaded to image corpus 136 and/or used to initiate an image search.

As shown in image database 135, metadata 138 may also be included to describe image corpus 136. For example, image corpus 136 may be preprocessed through vision model 242 and query language model 244 to generate metadata 138. Metadata 138 may also include other metadata. When a user accesses image search interface 240 via web browser 222, metadata 138 may be used to execute an image search on image corpus 136.

For example, to perform the preprocessing, each image in image corpus 136 may initially be divided into fixed partitions, such as an 8×8 grid, or partitioned into indexed relevance areas, for example by using Voronoi partitioning. Accordingly, an index number can be used to specify a positioning within an image canvas. Each indexed partition may then be processed through vision model 242 to generate semantic data describing the visual content of the partitions. To reduce search processing time and storage requirements, the final semantic data may be reduced to vectors of a fixed number of dimensions, such as 256 dimensions, for storing into metadata 138. The partition indexes and vector sets for each image, also referred to as spatial similarity indexes, may then be stored in metadata 138, along with partitioning data if necessary.

Since users typically search by natural language terms, preprocessing may also be performed for query language model 244. For example, query language model 244 may be trained to match the spatial similarity indexes of metadata 138 to natural language query terms by using machine learning techniques. Thus, image search interface 240 can utilize query language model 244 to derive semantic datasets from query terms, which can then be used to search directly against spatial similarity indexes in metadata 138 without invoking vision model 242. In this manner, run-time processing through vision model 242 can be minimized to improve search performance.

Although not specifically shown in FIG. 2, other users and associated clients may also be in communication with servers 130 over network 150. The other clients may include components similar to those shown in client 110 in FIG. 2.

Server 130 includes processor 236, communications module 238, and memory 232, which includes image search interface 240, vision model 242, and query language model 244. The processor 236 of the server 130 is configured to execute instructions, such as instructions physically coded into the processor 236, instructions received from software in memory 232, or a combination of both.

For example, the processor 236 of the server 130 may execute a web server or daemon that responds to Hypertext Transfer Protocol (HTTP) requests with Hypertext Markup Language (HTML) files and other browser interpretable formats. For example, the web server may provide image search interface 240 as a combination of HTML, JavaScript, cascading style sheets (CSS), extensible markup language (XML), and other web technologies, including client or server side scripting. Server 130 may also communicate with image database 135 to retrieve and store image data, or alternatively client 110 may directly access image database 135.

Processor 212 of client 110 receives, in response to user input from input device 216, a relevance area within a plurality of image results, wherein the plurality of image results are provided for display on a user interface shown on display device 214 in response to a first search query using a plurality of spatial anchors in association with respective semantic datasets, and wherein the relevance area is associated with a target semantic dataset. For example, a user may have previously started a composition aware image search using image search interface 240. The user can add, move, and resize spatial anchors, which specify regions or partitions within an image canvas. Each spatial anchor is associated with a respective semantic dataset, which may be derived using query language model 244 in conjunction with user specified query terms.

Searches may not necessarily begin with text based query terms. For example, a user may upload user image 228 to search for similar images, rather than specifying query terms. In this case, user image 228 may be processed through vision model 242 to automatically generate the spatial anchors and respective semantic datasets. The semantic datasets may also be processed through query language model 244 to provide text labels for the spatial anchors, but the semantic datasets may remain as-is to avoid over-abstracting the content of user image 228. Alternatively, thumbnail labels may be provided for spatial anchors that are not derived from a text based query term.

The first search query may be transmitted via network 150 from client 110 to server 130 for execution on server 130. After the first search query is executed, an interface shown in display device 214 may be updated with a list of image results retrieved from server 130. Note that when ranking an image to be included in the results, a ranking score may balance the two considerations of spatial proximity to the anchors and semantic dataset similarity. However, these considerations may also be weighted differently depending on user preference, image composition of image corpus 136, user account history, and other factors.

The user may use input device 216 to select one or more relevance areas within the image results. Based on the relevance areas selected, the associated target semantic dataset can be determined. The relevance areas may specify partitions or portions of an image, as well as an entire image. If the relevance areas include multiple images, then the target semantic dataset may be a mean or centroid of the vectors across images in the relevance areas.

Processor 212 of client 110 determines a mapping from the target semantic dataset to the plurality of spatial anchors. This mapping may be determined based on user input. For example, the user may directly indicate to which anchors a particular relevance area should be mapped. If no user input is provided, then the mapping may be determined by content matching algorithms. For example, cosine distance may be used to estimate content similarity between the target semantic dataset and the respective semantic datasets of the plurality of spatial anchors, wherein the target semantic dataset is mapped to anchors that have semantic datasets within a threshold cosine distance.

Processor 212 of client 110 adjusts, based on the mapping, the semantic datasets associated with the plurality of spatial anchors by moving the semantic datasets towards the target semantic dataset. Since the target semantic dataset represents the visual content that the user wants to see in the search results, the semantic datasets are adjusted towards the target semantic dataset to refine the search results. For example, the vectors of the semantic datasets may be moved to an intermediate point towards the target semantic dataset, such as a midpoint. Other methods of adjustment may be utilized as well.

Processor 212 of client 110 provides for display, in the user interface, a plurality of refined image results in response to a second search query using the plurality of spatial anchors in association with the adjusted semantic datasets. Thus, the second search query may be submitted to server 130 for execution, and a refined list of image results may be retrieved for updating the user interface shown on display device 214.

In further aspects of the subject technology, the semantic datasets comprise, for each of the plurality of spatial anchors, vectors of a fixed number of dimensions from vision model 242. As discussed above, preprocessing may be performed to generate vectors of a fixed number of dimensions, such as 256 dimensions, for the spatial similarity indexes in metadata 138. Thus, when the user provides search query terms that are processed through query language model 244, vectors of the same fixed number of dimensions may be retrieved for each of the search query terms.

In further aspects of the subject technology, the first search query and the second search query are performed over network 150. For example, as discussed above, client 110 may send the first and second search queries to server 130 via network 150. Server 130 may execute the search queries and provide a set of image results from image corpus 136 back to client 110 via network 150.

The techniques described herein may be implemented as method(s) that are performed by physical computing device(s), as one or more non-transitory computer-readable storage media storing instructions which, when executed by computing device(s), cause performance of the method(s), or, as physical computing device(s) that are specially configured with a combination of hardware and software that causes performance of the method(s).

Figure 3:
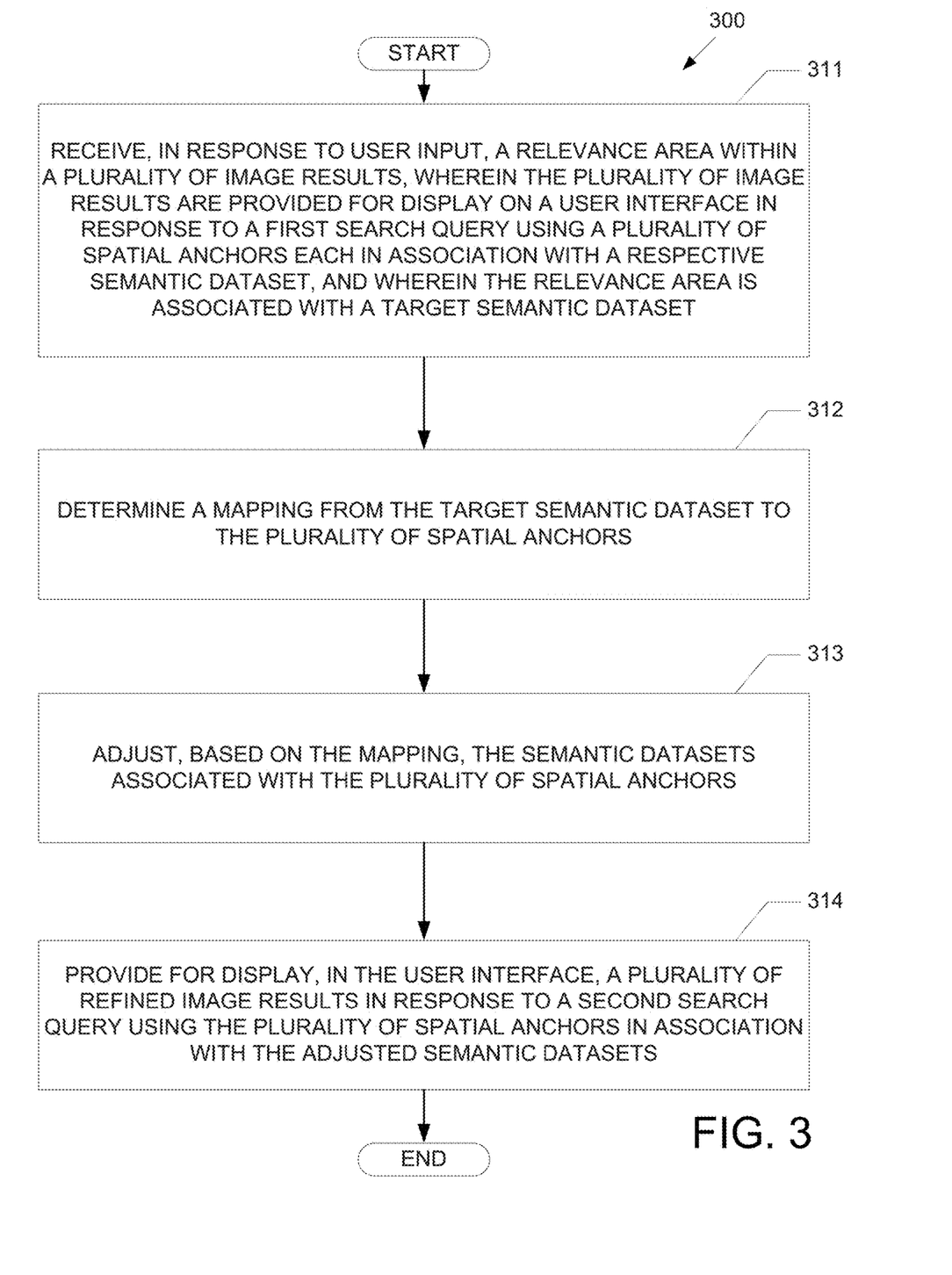
FIG. 3 illustrates an example process for providing composition aware image search refinement using relevance feedback with the example client of FIG. 2.

FIG. 3 illustrates an example process 300 for providing composition aware image search refinement using relevance feedback with the example client 110 of FIG. 2. While FIG.

3 is described with reference to FIG. 2, it should be noted that the process steps of FIG. 3 may be performed by other systems.

The process 300 begins by proceeding to step 311, where processor 212 receives, in response to user input from input device 216, a relevance area within a plurality of image results, wherein the plurality of image results are provided for display on a user interface shown on display device 214 in response to a first search query using a plurality of spatial anchors in association with respective semantic datasets, and wherein the relevance area is associated with a target semantic dataset.

Figure 4A:
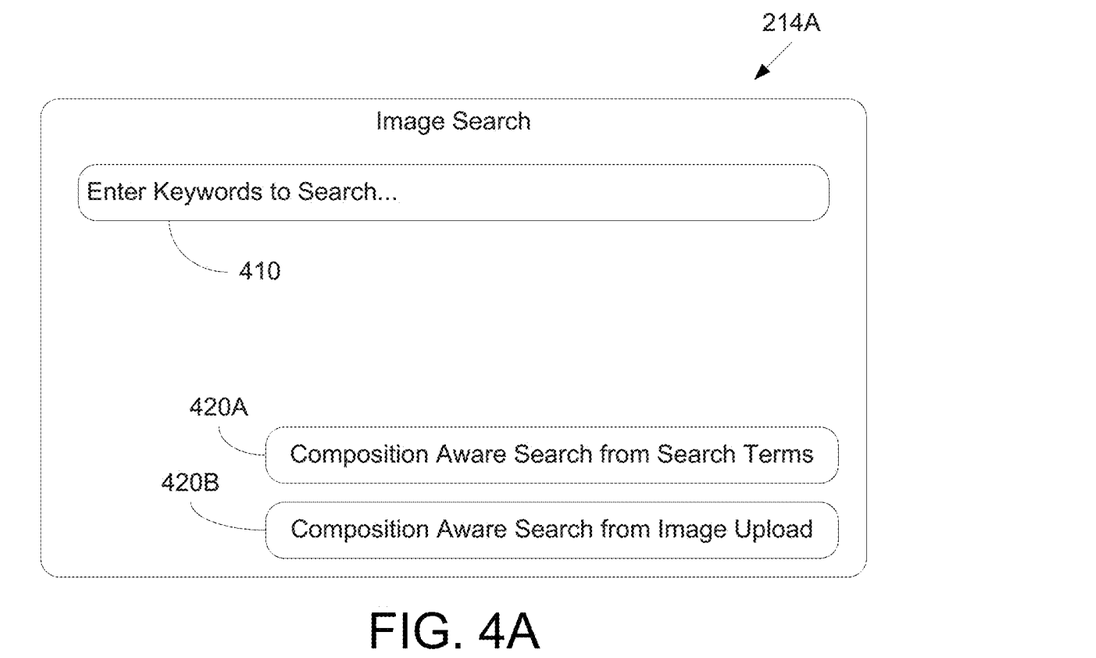
FIG. 4A, FIG. 4B, FIG. 4C, FIG. 4D, FIG. 4E and FIG. 4F illustrate example user interfaces for providing composition aware image search refinement using relevance feedback.

For example, referring to FIG. 4A, an example user interface is displayed on display device 214A for providing composition aware image search refinement using relevance feedback. The user interface includes query bar 410, button 420A, and button 420B. While a web browser is not specifically shown on display device 214A, it may be assumed that the user interface is displayed in a browser window.

The user interface shown in FIG. 4A may correspond to a rendering of image search interface 240 from FIG. 2. As shown in FIG. 4A, the user may be presented with several options for image search, including a keyword search via query bar 410, a composition aware search from search terms via button 420A, and a composition aware search from image upload via button 420B. For example, assume that the user is interested in images where a wine bottle is positioned to the left side, and wherein cheese is positioned to the right side. Accordingly, the user may select button 420A, since the user wants to specify positioning of search terms.

Figure 4B:
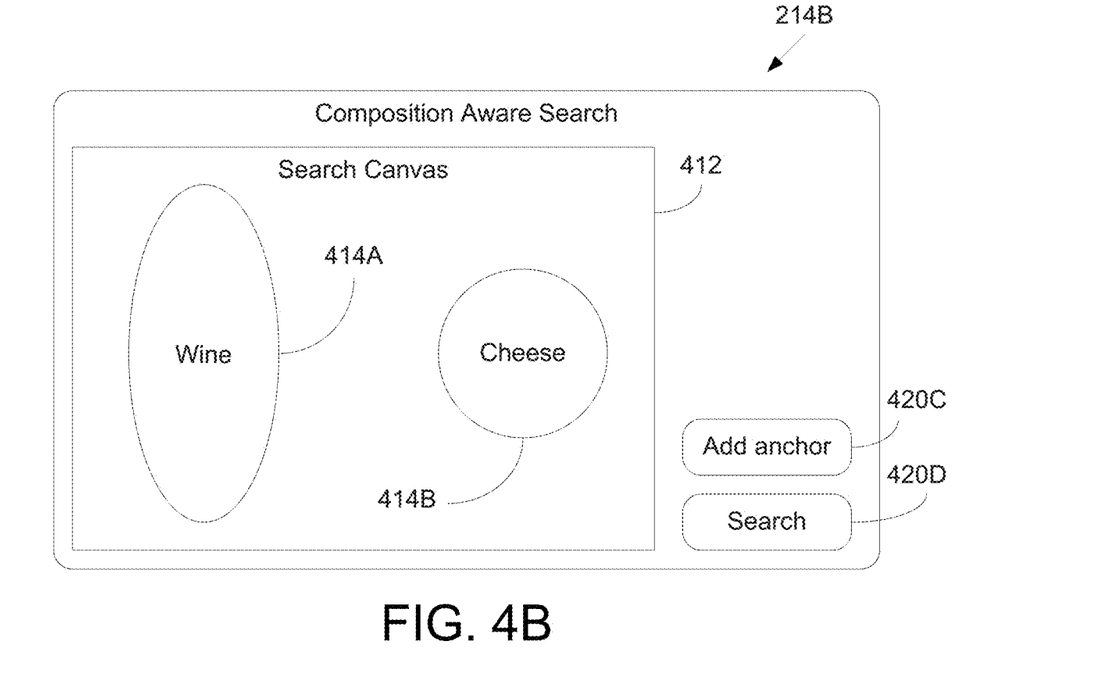

Display device 214A from FIG. 4A may transition to display device 214B in FIG. 4B, which includes image canvas window 412, anchor 414A, anchor 414B, button 420C, and button 420D. As discussed above, the user can add, move, and resize spatial anchors, which specify regions or partitions within an image canvas. For example, the user may have already used button 420C to add two anchors 414A and 414B that are shown in image canvas window 412. For each anchor, the user may define and modify the size, shape, position, and associated query terms. Once the user is satisfied with the layout in image canvas window 412, the user may select button 420D.

Note that if the user instead selected button 420B for starting a composition aware search based on an image upload, the user may select user image 228 from FIG. 2 for uploading. Anchors may then be automatically generated based on processing user image 228 through vision model 242 and query language model 244. Alternatively or additionally, the user may also manually add anchors. As discussed above, the anchors may be labeled using text labels or image thumbnails, but the semantic datasets for each anchor remain associated with the specific underlying image data within user image 228, rather than a generic text-based search term.

Figure 4C:
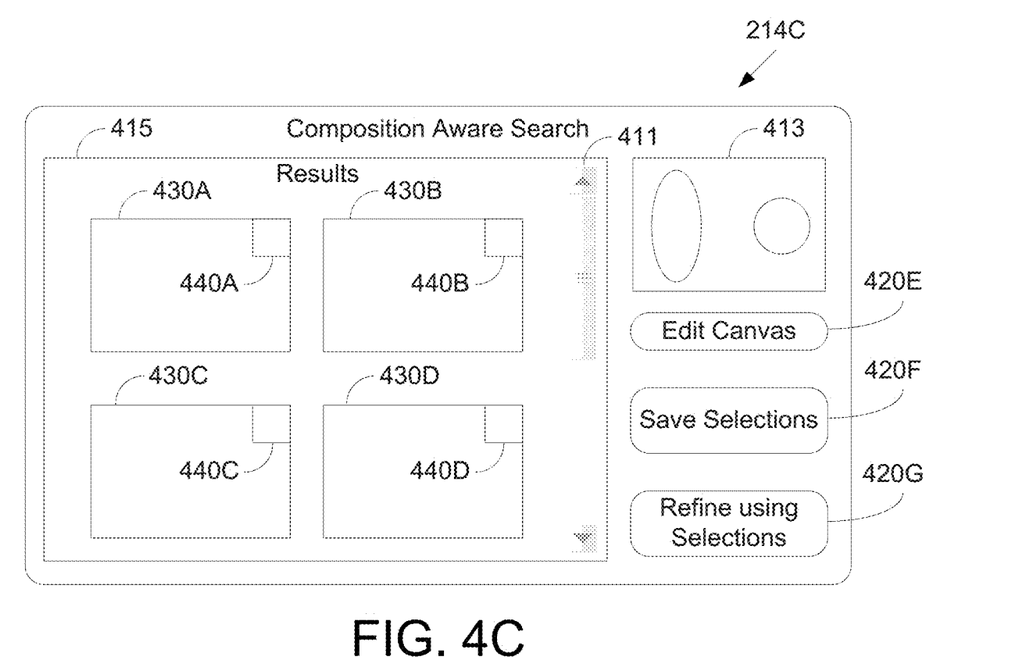

After button 420B is selected, display device 214B from FIG. 4B may transition to display device 214C in FIG. 4C, which includes result window 415, mini canvas 413, button 420E, button 420F, and button 420G. Result window 415 includes image result 430A, image result 430B, image result 430C, image result 430D, radio button 440A, radio button 440B, radio button 440C, radio button 440D, and slider 411. Mini canvas 413 may correspond to a smaller version of image canvas window 412 from FIG. 4B.

As shown in FIG. 4C, several image results 430A-430D are shown in result window 415 in response to a first search query initiated by button 420D in FIG. 4B. Additional results may be viewed using slider 411. The user may browse the results and determine that a good match is not yet found. In this case, the user may provide relevance feedback by using radio buttons 440A-440D to indicate relevance areas. The user may also adjust the anchors by using button 420E, which may return to an interface similar to display device 214B of FIG. 4B. Once the user is satisfied with the relevance feedback and any anchor adjustments, button 420G may be selected to refine the search.

Figure 4D:
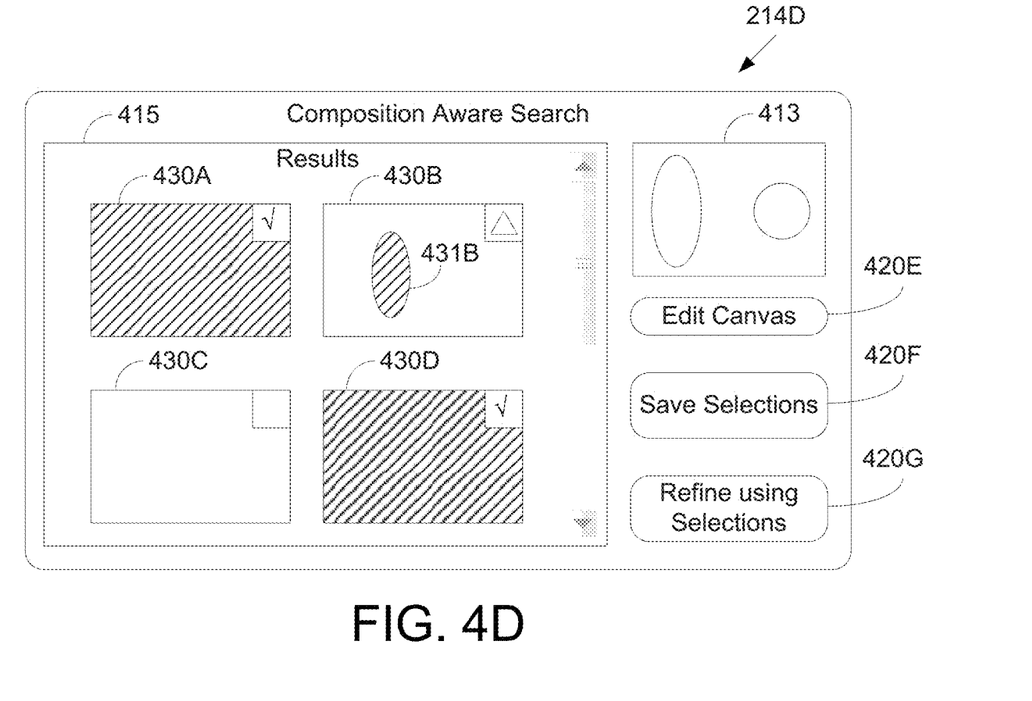

After browsing the results in result window 415, the user might want to narrow down to a particular configuration of wine and cheese. For example, assume that the user is interested in images where a wine bottle is pouring into a glass, and wherein the cheese includes an entire wheel of cheese. Image result 430A and image result 430D may correspond to this configuration of wine and cheese, whereas image result 430B may include a wine bottle pouring into a glass next to a sliced cheese platter, and image result 430C may include a standing wine bottle with cheese on crackers. As a result, referring to display device 214D of FIG. 4D, the user may indicate an entirety of image result 430A, a portion 431B of image result 430B corresponding to the pouring wine bottle only, and an entirety of image result 430D as the relevance areas. As shown in FIG. 4D, the relevance areas may be shaded, outlined, or otherwise highlighted in result window 415.

Note that the particular positioning of portion 431B within image result 430B is irrelevant for the purposes of refining the search, as the desired positioning is already defined by the anchors in image canvas window 412. Thus, the selection of portion 431B signals that the wine bottle is relevant without specifying anything about the wine bottle's positioning.

To indicate the relevance areas, the user may click on radio buttons 440A-440D to cycle between irrelevant (no mark), entire image relevant (checkmark), or portion(s) of the image relevant (triangle). For the triangle option, the user may be prompted to select the relevant area(s) within the image. Additionally, the user may be provided with an option to create a new anchor corresponding to an identified relevance area if a suitable anchor does not already exist. For example, the original search only included "Wine" and "Cheese," but image result 430B might have an interesting background that the user now wants to include. In this case, the user can create a new anchor for "Background" and specify a relevance area within image result 430B corresponding to the background. As discussed above, the semantic dataset for this new anchor is based on the underlying image data in image result 430B, rather than a generic text concept of "Background."

In step 312, processor 212 determines a mapping from the target semantic dataset to the plurality of spatial anchors. As discussed above, the user may explicitly associate particular anchors with relevance areas, or a matching algorithm may be used to match relevance areas to the most similar spatial anchors.

In step 313, processor 212 adjusts, based on the mapping, the semantic datasets associated with the plurality of spatial anchors. For example, the semantic datasets may be moved towards the target semantic dataset, as discussed above. Further, the target semantic dataset may be a mean or centroid of the relevance areas.

In step 314, processor 212 provides for display, in the user interface shown on display device 214, a plurality of refined image results in response to a second search query using the plurality of spatial anchors in association with the adjusted semantic datasets. For example, once the user is satisfied with the selections for the relevance areas, the user may select button 420G in FIG. 4D to initiate the second search query with the adjusted semantic datasets. Display device 214D of FIG. 4D may transition to display device 214E of FIG. 4E, wherein the result window 415 is updated with a set of refined images represented by image result 432A, image result 432B, image result 432C, image result 432D, and additional off-screen image results.

Figure 4E:
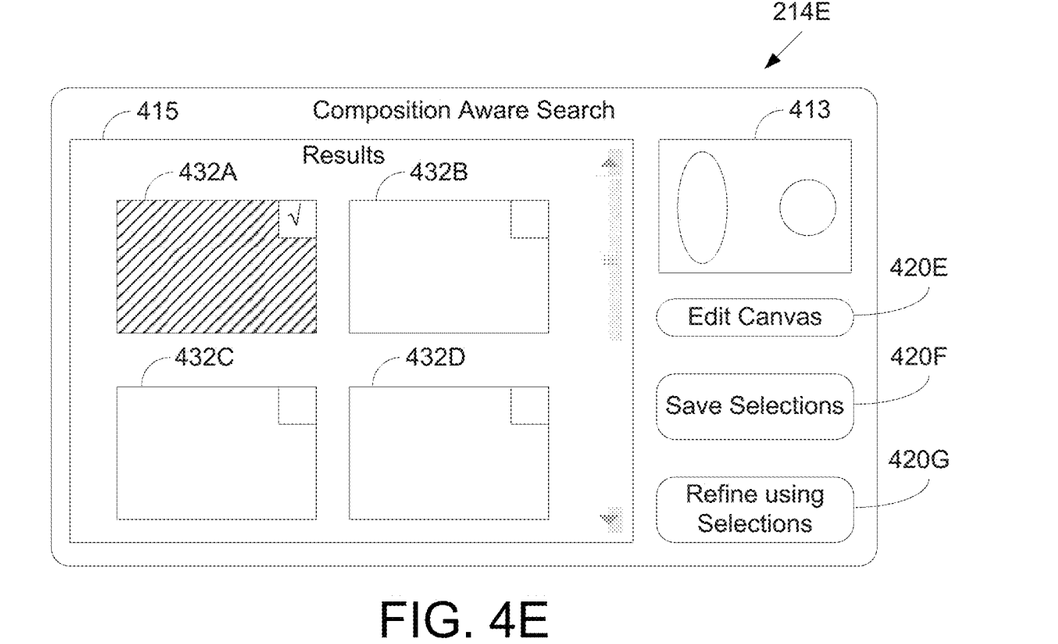

The refined images may now more closely reflect the desired configuration of "a wine bottle pouring into a glass" and "an entire wheel of cheese," as these visual characteristics may be encapsulated by the target semantic dataset associated with the relevance areas. Meanwhile, assuming that the user did not modify the anchors in the image canvas as indicated by mini canvas 413 remaining unchanged, the specified positioning of the wine on the left side and the cheese on the right side is preserved even for the refined images.

Of course, the search queries can only provide best match results according to the size and makeup of image corpus 136. If images with suitable object positioning are unavailable, then best-effort matches may still be provided for the target semantic dataset. To provide better matching results to cover a wide range of object positions, new images may be periodically added to image corpus 136. Additionally, image processing may be supported to provide closer matches, for example by using X or Y axis mirroring, by rotating or deforming images, or by compositing images.

In further aspects of the subject technology, the semantic datasets comprise, for each of the plurality of spatial anchors, vectors of a fixed number of dimensions from vision model 242.

In further aspects of the subject technology, the first search query and the second search query are performed over network 150.

In further aspects of the subject technology, at least one of the plurality of spatial anchors is moved in response to user input, for example by using button 420E to access a user interface similar to image canvas window 412 in FIG. 4B, as discussed above.

Figure 4F:
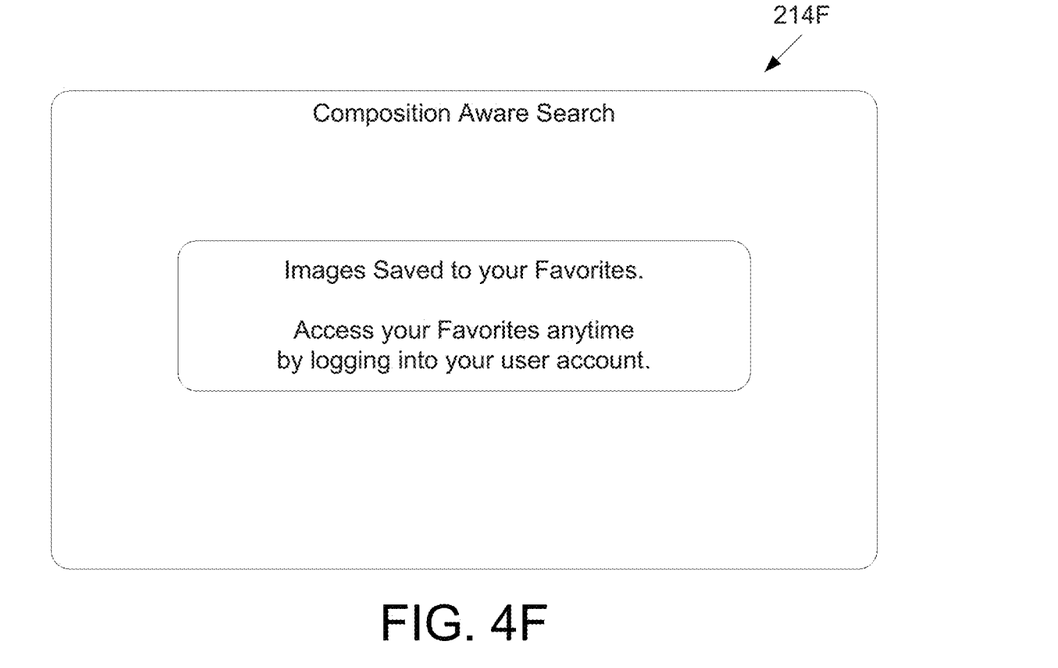

In further aspects of the subject technology, processor 212 receives an image selection from image results 432A-432D in result window 415. For example, the user may select image result 432A as shown in FIG. 4E, and select button 420F. Display device 214E of FIG. 4E may transition to display device 214F of FIG. 4F, indicating to the user that the selected image result 432A has been saved to the "Favorites" of the user's account. For example, processor 212 may cause server 130 to store an association of image result 432A with the user's account. In this manner, the user can quickly retrieve image result 432A without going through the search process again. Optionally, the user may also download a copy of image result 432A into memory 220 when the user account is granted permission to download such images.

It should be noted that the example user interfaces shown in the Figures are only exemplary, and other user interfaces could be used. For example, context menus, pop-up dialogs, hovering tooltips, and other interface elements may be used to provide an interface for composition aware image search refinement using relevance feedback.

Hardware Overview

Figure 5:
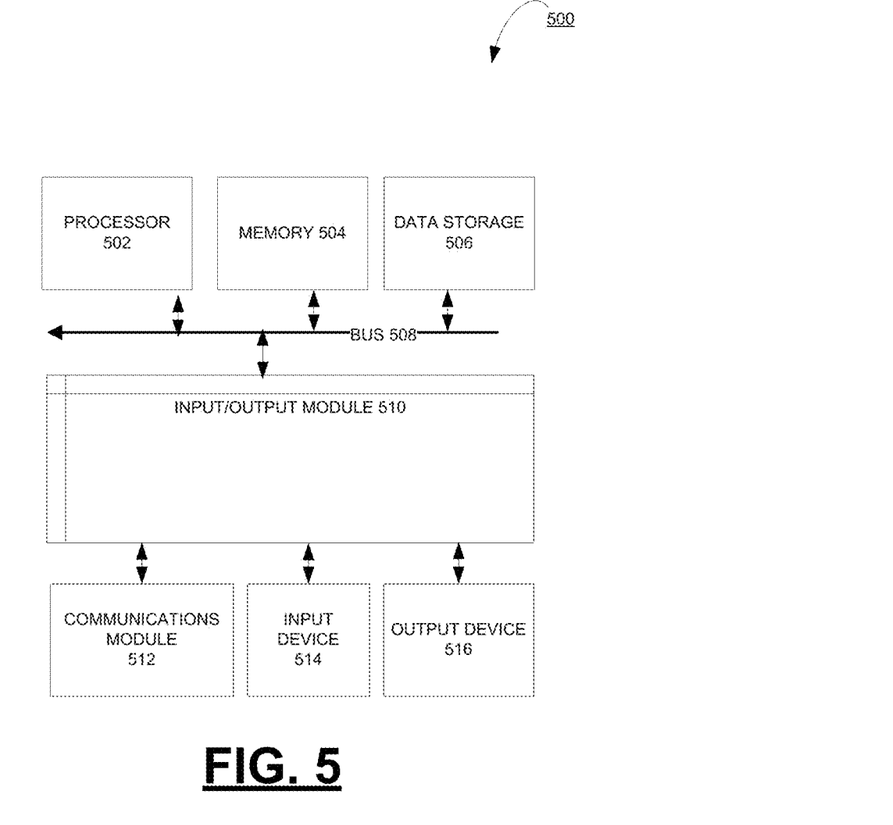
FIG. 5 is a block diagram illustrating an example computer system with which the clients and servers of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110A, client 110B, client 110C, client 110D, and server 130) includes a bus 508 or other communication mechanism for communicating information, and a processor 502 (e.g., processor 212, 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220, 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In-Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perd, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input device 216, display device 214). The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 (e.g., communications module 218, 238) include networking interface cards, such as Ethernet cards and modems.

The components of the system can be interconnected by any form or medium of digital data communication (e.g., a communication network). The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic, or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link, and communications module 512. In the Internet example, a server might transmit a requested code for an application program through the Internet, the ISP, the local network, and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216) and/or an output device 516 (e.g., display device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the client 110A can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for providing composition aware image search refinement using relevance feedback, the method comprising:
   receiving, in response to user input, a relevance area comprising partitions within a plurality of image results, wherein the plurality of image results are provided for display on a user interface in response to a first search query using a plurality of spatial anchors in association with respective semantic datasets, and wherein the relevance area is associated with a target semantic dataset;
   determining a mapping from the target semantic dataset to the plurality of spatial anchors, the mapping based at least in part on a content matching algorithm when the user input does not include the mapping, the content matching algorithm calculating a cosine distance comprising an estimate of content similarity between the target semantic dataset and the respective semantic datasets of the plurality of spatial anchors, wherein the target semantic dataset is mapped to anchors comprising semantic datasets within a threshold cosine distance;
   adjusting, based on the mapping, the semantic datasets associated with the plurality of spatial anchors, comprising moving vectors of the semantic datasets to an intermediate point towards the target semantic dataset; and providing for display, in the user interface, a plurality of refined image results in response to a second search query using the plurality of spatial anchors in association with the semantic datasets.

2. The method of claim 1, wherein the relevance area includes portions from multiple images of the plurality of image results.

3. The method of claim 1, wherein the relevance area includes one or more entire images from the plurality of image results.

4. The method of claim 1, wherein the target semantic dataset is a mean for images in the relevance area.

5. The method of claim 1, wherein determining the mapping is based on the user input.

6. The method of claim 1, wherein adjusting the semantic datasets moves the semantic datasets towards the target semantic dataset.

7. The method of claim 1, wherein the semantic datasets comprise, for each of the plurality of spatial anchors, vectors of a fixed number of dimensions from a vision model.

8. The method of claim 1, wherein the first search query and the second search query are performed over a network.

9. The method of claim 1, further comprising, prior to providing for display the plurality of refined image results:
moving at least one of the plurality of spatial anchors in response to the user input.

10. The method of claim 1, wherein the semantic datasets associated with the plurality of spatial anchors are derived from query terms using a query language model.

11. The method of claim 1, wherein the semantic datasets associated with the plurality of spatial anchors are based on vision model metadata associated with an image database used for processing the first search query.

12. The method of claim 1, wherein the semantic datasets associated with the plurality of spatial anchors are based on a user generated image.

13. The method of claim 1, further comprising:
receiving an image selection from the plurality of refined image results; and
causing an association of the image selection to be stored with a user account.

14. A system for providing composition aware image search refinement using relevance feedback, the system comprising:
a memory; and
a processor configured to execute instructions which, when executed, cause the processor to:
receive, in response to user input, a relevance area comprising partitions within a plurality of image results, wherein the plurality of image results are provided for display on a user interface in response to a first search query using a plurality of spatial anchors in association with respective semantic datasets, and wherein the relevance area is associated with a target semantic dataset;
determine a mapping from the target semantic dataset to the plurality of spatial anchors, the mapping based at least in part on a content matching algorithm when the user input does not include the mapping, the content matching algorithm calculating a cosine distance comprising an estimate of content similarity between the target semantic dataset and the respective semantic datasets of the plurality of spatial anchors, wherein the target semantic dataset is mapped to anchors comprising semantic datasets within a threshold cosine distance;
adjust, based on the mapping, the semantic datasets associated with the plurality of spatial anchors by moving the semantic datasets towards the target semantic dataset, comprising moving vectors of the semantic datasets to an intermediate point towards the target semantic dataset; and
provide for display, in the user interface, a plurality of refined image results in response to a second search query using the plurality of spatial anchors in association with the semantic datasets.

15. The system for providing composition aware image search refinement using relevance feedback of claim 14, wherein to receive a relevance area comprises to retrieve an image in the target semantic dataset.

16. The system for providing composition aware image search refinement using relevance feedback of claim 14, wherein the semantic datasets comprise, for each of the plurality of spatial anchors, vectors of a fixed number of dimensions from a vision model.

17. The system for providing composition aware image search refinement using relevance feedback of claim 14, wherein the first search query and the second search query are performed over a network.

18. The system for providing composition aware image search refinement using relevance feedback of claim 14, wherein the semantic datasets associated with the plurality of spatial anchors are derived from query terms using a query language model.

19. The system for providing composition aware image search refinement using relevance feedback of claim 14, wherein the semantic datasets associated with the plurality of spatial anchors are based on vision model metadata associated with an image database used for processing the first search query.

20. A computer-implemented method for providing composition aware image search refinement using relevance feedback, the method comprising:
executing a first search query using a plurality of spatial anchors in association with respective semantic datasets;
providing a plurality of image results for display on a user interface in response to executing the first search query;
receiving a relevance area comprising partitions within the plurality of image results, wherein the relevance area is associated with a target semantic dataset;
determining a mapping from the target semantic dataset to the plurality of spatial anchors, the mapping based at least in part on a content matching algorithm when a user input does not include the mapping, the content matching algorithm calculating a cosine distance comprising an estimate of content similarity between the target semantic dataset and the respective semantic datasets of the plurality of spatial anchors, wherein the target semantic dataset is mapped to anchors comprising semantic datasets within a threshold cosine distance;
adjusting, based on the mapping, the semantic datasets associated with the plurality of spatial anchors, comprising moving vectors of the semantic datasets to an intermediate point towards the target semantic dataset;
executing a second search query using the plurality of spatial anchors in association with the semantic datasets; and
providing a plurality of refined image results for display on the user interface in response to executing the second search query.

\* \* \* \* \*